W. R. DOWNING.
Combined Harrow and Roller.
No. 159,163. Patented Jan. 26, 1875.
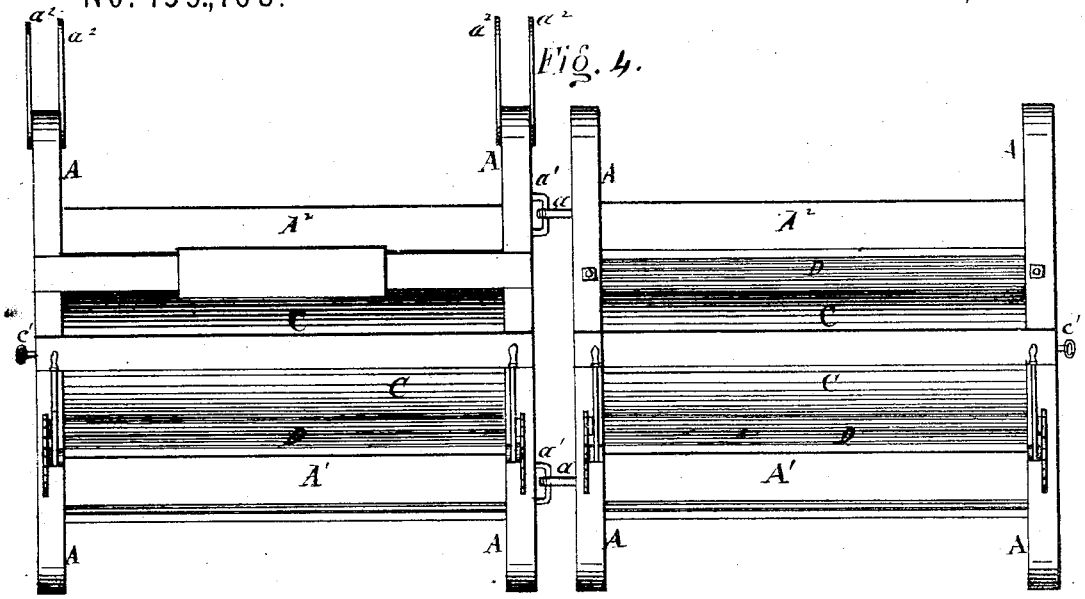
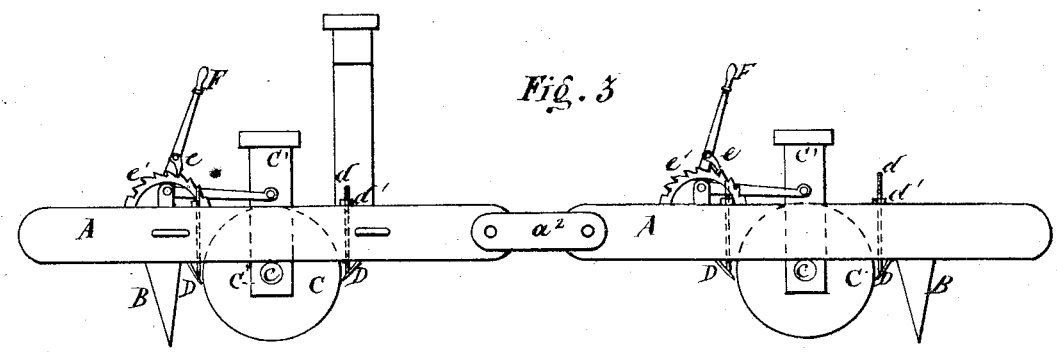
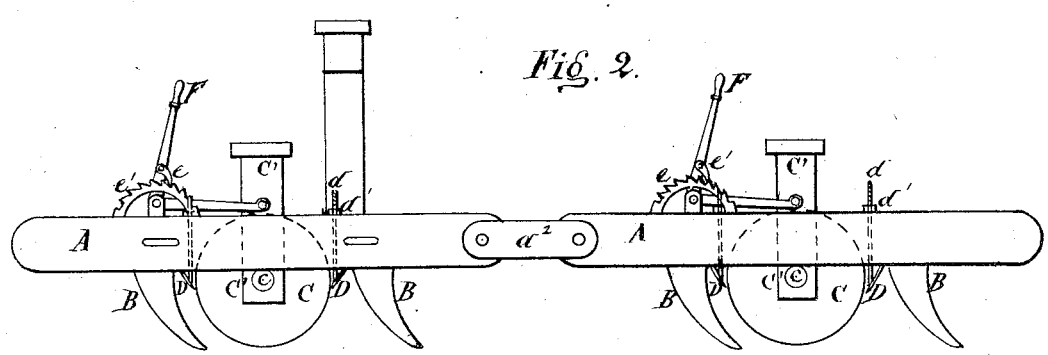
Witnesses
Henry Orth
Jno. J. Hadley, Jr.
Inventor
William R. Downing
H. H. Doubleday
att'y

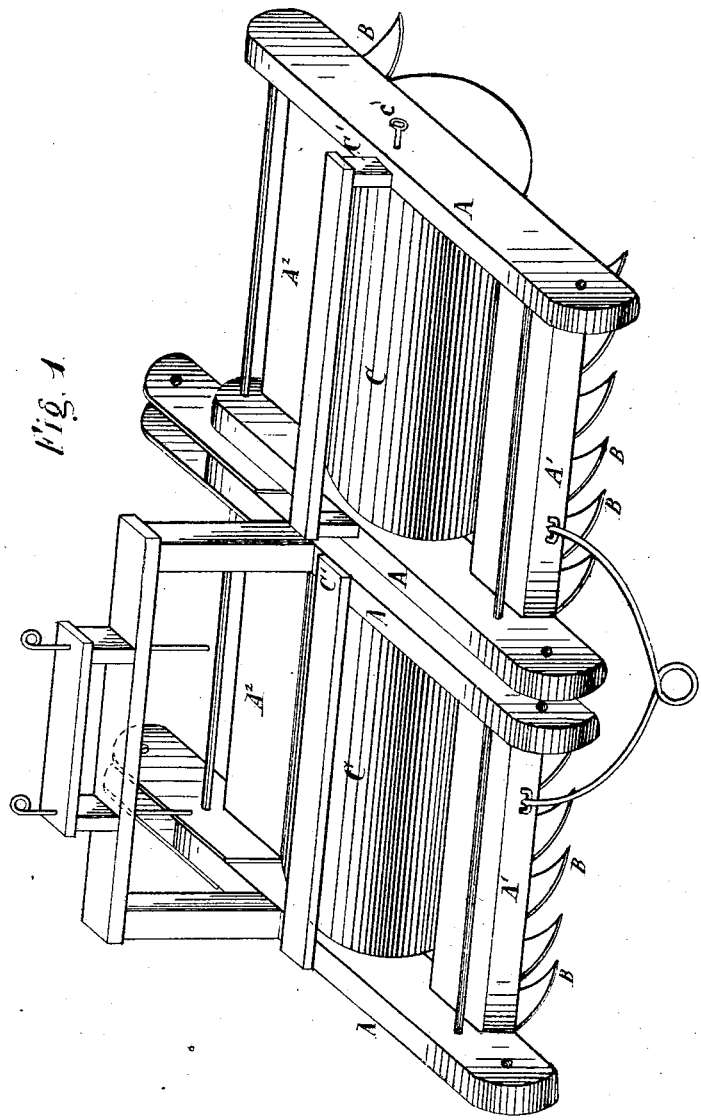

UNITED STATES PATENT OFFICE.

WILLIAM R. DOWNING, OF MURFREESBOROUGH, TENNESSEE.

IMPROVEMENT IN COMBINED HARROWS AND ROLLERS.

Specification forming part of Letters Patent No. 159,163, dated January 26, 1875; application filed November 21, 1874.

*To all whom it may concern:*

Be it known that I, WILLIAM R. DOWNING, of Murfreesborough, in the county of Rutherford and State of Tennessee, have invented certain new and useful Improvements in Combined Harrow and Roller; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a perspective view of my improved harrow, the two sections being arranged side by side. Fig. 2 is an end view, one section being arranged in rear of the other. Fig. 3 is an end view of a modification of the construction shown in Fig. 2; and Fig. 4 is a top or plan view of the modified construction, under the arrangement shown in Fig. 1.

The frames are composed of the side pieces A and girts or cross-pieces $A^1$ $A^2$, these parts being framed and bolted to each other in any usual or approved method. The sections of the harrow are each provided with hooks $a$ and loops $a^1$, (see Fig. 4,) and with links or straps $a^2$, Figs. 2, 3, 4, or the equivalents of these devices, whereby said sections may be easily connected with each other under the various relations in which they are shown in the drawings. B B are the harrow-teeth, in Figs. 1 and 2. I employ the form therein shown. In Figs. 3 and 4 are represented a tooth, which is better adapted for use under the proposed modification. C C are rollers, made by preference in short sections, and mounted upon axles or shafts, so as to revolve freely thereon, for convenience in turning the harrow around. The roller-shafts are supported in plates, boxes, or hangers C', constructed to slide vertically in the inclosing-frames. D D are scrapers, secured to girts $A^2$, in order to prevent the soil from accumulating upon the rollers. They (the scrapers) may be readily removed or adjusted toward or from the rollers by means of screw-rod $d$ and nut $d'$. E E are levers pivoted upon the frame, and having each an elbow-extension or bent arm, which is connected with one of the sliding boxes or hangers carrying the roller-shaft. Thus the operator can raise or lower the frames, or either side of each frame upon the roller, and thereby determine and regulate the depth to which the teeth shall enter the ground, such adjustment of the frame being maintained by means of a pawl, $e$, and ratcheted segment, $e'$, on the lever, or by pins $c'$. When the sections are arranged as shown in Fig. 3, the ground will be left in drills adapted to receive the seed, and when arranged as in Fig. 4, teeth being only in girt $A^1$, the teeth will cover the grain which has been previously sown, while the rollers will leave the ground in a very smooth condition.

Among other advantages growing out of the capability of the frame and teeth for being adjusted upon the rollers is this: In harrowing upon a side hill, the teeth upon the upper side may be made to enter the ground the deepest, thus producing side draft, and counteracting the tendency of the harrow to "sag" down hill. Again, by setting the teeth to cut deeper at one side than at the other, and making the track cut by each trip to partially overlap the path of the preceding trip, the shallowest cutting-teeth next to the finished ground, I can pulverize the ground to a great depth, and yet leave a comparatively smooth surface.

I do not claim, broadly, making the roller or rollers adjustable vertically in the frame, but I believe that such an adjustment in a combined harrow and roller, which is composed of two sections, provided with detachable hinges, so that the parts can be arranged as I have described, possesses advantages over those heretofore in use, because a person can set the frame of the rear section at such height upon the roller that the teeth will not enter the ground, and then at one operation get the benefit of the alternate rolling and harrowing, and yet leave the ground smooth from the roller, after having sown his seed.

I claim—

1. A combined harrow and roller, made in sections, provided with detachable hinges at both the sides and ends of the frame, whereby one section may be arranged in front of the other or by the side thereof, substantially as set forth.

2. In a combined harrow and roller, composed of two sections provided with detachable hinges or connections, substantially as set forth, the vertically-adjustable rollers, substantially as specified.

3. The combination of the bent levers E, pawls e', and ratchets e, with the hanger C', roller C, teeth B, and the supporting-frame, substantially as set forth.

In testimony that I claim the foregoing as my own, I have affixed my signature in presence of two witnesses.

WILLIAM R. DOWNING.

Witnesses:
 CHAS. A. GORDON,
 CHAS. R. HOLMES.